(12) United States Patent
Niiori et al.

(10) Patent No.: US 6,487,066 B1
(45) Date of Patent: Nov. 26, 2002

(54) ELECTRIC DOUBLE LAYER CAPACITOR AND METHOD FOR PRODUCING THE SAME

(75) Inventors: Yusuke Niiori, Inuyama (JP); Hiroyuki Katsukawa, Niwa-Gun (JP); Hitoshi Yoshida, Okazaki (JP); Makoto Takeuchi, Kunitachi (JP); Michio Okamura, Yokohama (JP)

(73) Assignees: NGK Insulators, Ltd., Nagoya (JP); Jeol Ltd., Tokyo (JP); Okamura Laboratory Inc., Yokohama (JP)

( * ) Notice: Subject to any disclaimer, the term of this patent is extended or adjusted under 35 U.S.C. 154(b) by 0 days.

(21) Appl. No.: 09/387,995

(22) Filed: Sep. 1, 1999

(30) Foreign Application Priority Data

Sep. 3, 1998 (JP) .......................... 10-249640

(51) Int. Cl.$^7$ .......................... H01G 9/00; H01G 9/058
(52) U.S. Cl. .................... 361/502; 361/503; 423/445 R
(58) Field of Search ................ 361/502–507; 423/445 R

(56) References Cited

U.S. PATENT DOCUMENTS

| | | | | |
|---|---|---|---|---|
| 3,652,902 A | * | 3/1972 | Hart et al. ................ | 361/502 |
| 4,485,155 A | * | 11/1984 | Holl et al. ................. | 429/338 |
| 5,208,003 A | * | 5/1993 | Simandl et al. ......... | 423/445 R |
| 5,300,272 A | * | 4/1994 | Simandl et al. ......... | 423/445 R |
| 5,303,118 A | * | 4/1994 | Saito et al. ................ | 29/25.03 |
| 5,319,518 A | * | 6/1994 | Blood ........................ | 361/502 |
| 5,589,289 A | * | 12/1996 | Zhang et al. .............. | 429/122 |
| 5,591,545 A | * | 1/1997 | Miyashita et al. ........ | 429/218 |
| 5,688,483 A | * | 11/1997 | Zhang et al. .......... | 423/445 R |
| 5,690,901 A | * | 11/1997 | Zhang et al. ............ | 423/449.6 |
| 5,706,165 A | * | 1/1998 | Saito et al. ................ | 361/502 |
| 5,786,555 A | * | 7/1998 | Saito et al. ................ | 204/294 |
| 5,993,969 A | * | 11/1999 | Tan ............................ | 428/408 |
| 6,045,769 A | * | 4/2000 | Kambe et al. ........... | 423/447.3 |
| 6,205,016 B1 | * | 3/2001 | Niu ............................ | 361/503 |

FOREIGN PATENT DOCUMENTS

JP 9-320906 12/1997

OTHER PUBLICATIONS

U.S. patent application Ser. No. 09/473,416, Docket No. 791 079, Yusuke Niiori et al., filed Dec. 29, 1999.
U.S. patent application Ser. No. 09/649,545, Docket No. 791 113, Yusuke Niiori et al., filed Aug. 28, 2000.
U.S. patent application Ser. No. 10/068,484, Docket No. 791 184, Yusuke Niiori et al., filed Feb. 5, 2002.

* cited by examiner

Primary Examiner—Dean A. Reichard
Assistant Examiner—Eric W. Thomas
(74) Attorney, Agent, or Firm—Burr & Brown

(57) ABSTRACT

Disclosed is an electric double layer capacitor including polarizable electrodes immersed in an organic electrolyte, wherein a carbon material for forming the polarizable electrode is a carbon material including graphite-like microcrystalline carbon produced by effecting a heat treatment together with at least one of an alkali metal and an alkali metal compound at not less than a temperature at which alkali metal vapor is generated, and an electrostatic capacity is expressed by insertion of ions of a solute of the organic electrolyte into a space between microcrystalline carbon layers of the carbon material. Accordingly, it is possible to achieve an electrostatic capacity and a withstand voltage which exceed those of the conventional electric double layer capacitor based on the activated carbon system.

12 Claims, 8 Drawing Sheets

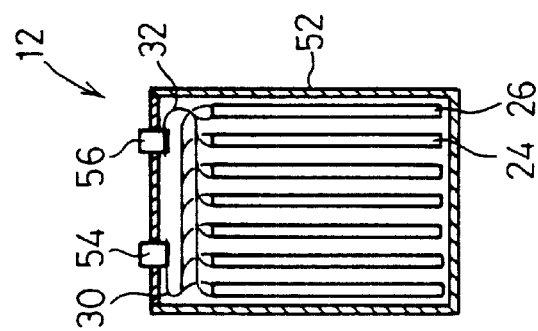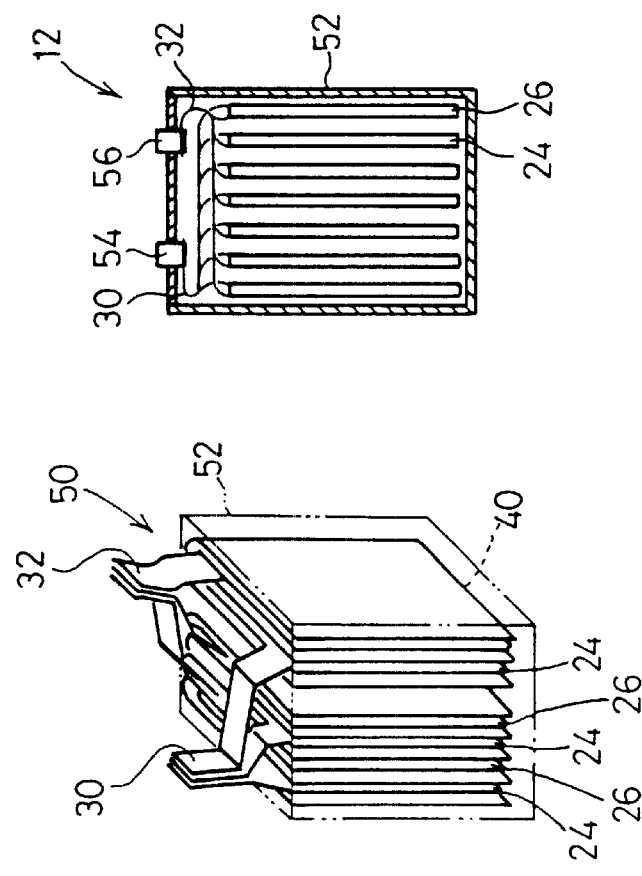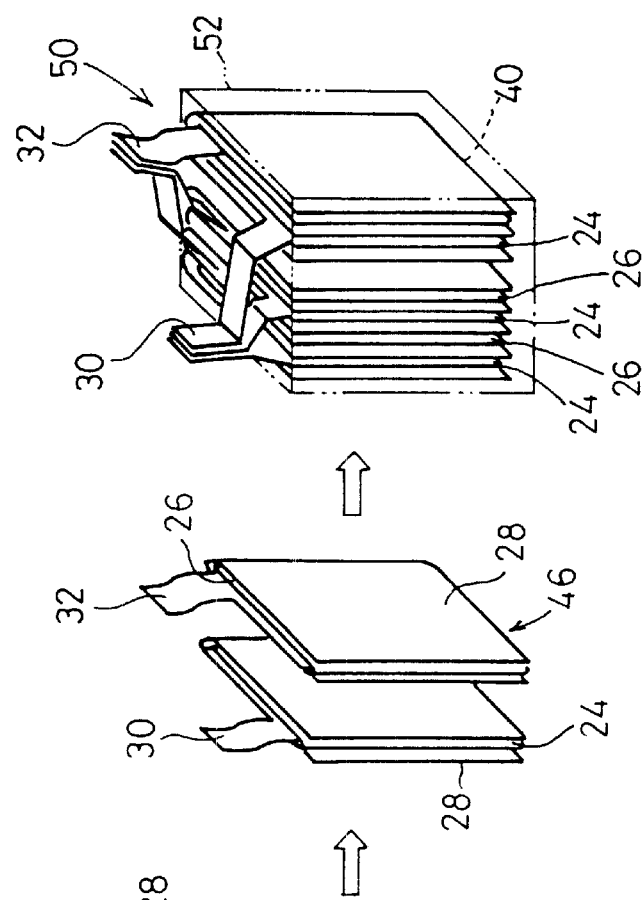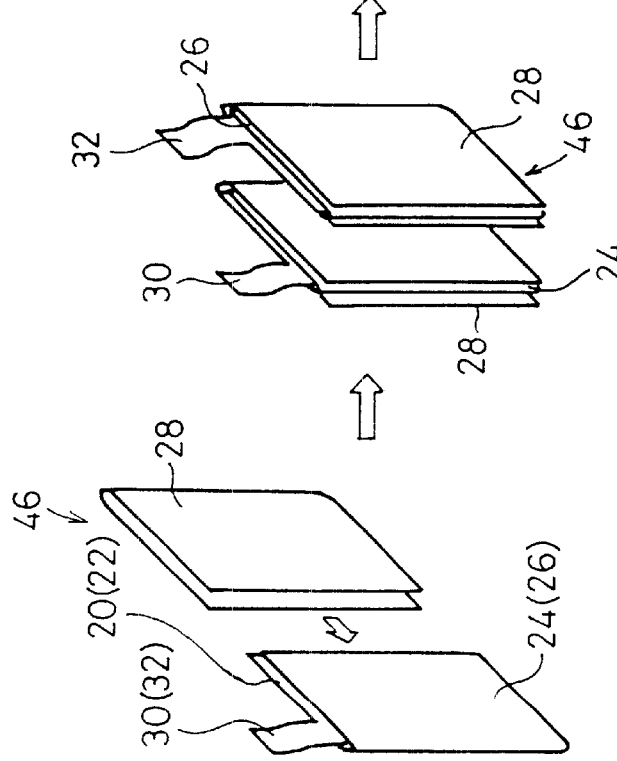

FIG. 8

|  | ELECTROSTATIC CAPACITY |
|---|---|
| EXAMPLE 1 | 27F/cc (4V) |
| EXAMPLE 2 | 35F/cc (4V) |
| EXAMPLE 3 | 22F/cc (4V) |
| EXAMPLE 4 | 28.5F/cc (4V) |
| EXAMPLE 5 | 31F/cc (4V) |
| EXAMPLE 6 | 32.5F/cc (4V) |
| EXAMPLE 7 | 25F/cc (4V) |
| COMPARATIVE EXAMPLE 1 | 21F/cc (2.5V) |
| COMPARATIVE EXAMPLE 2 | 17F/cc (2.5V) |

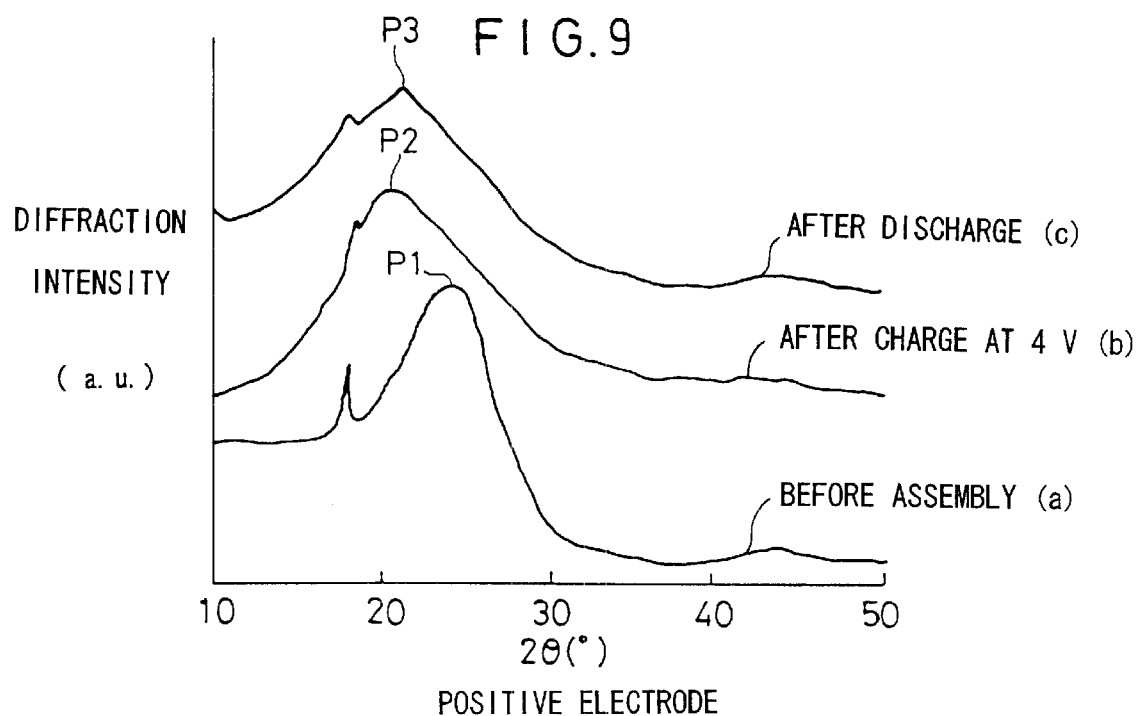
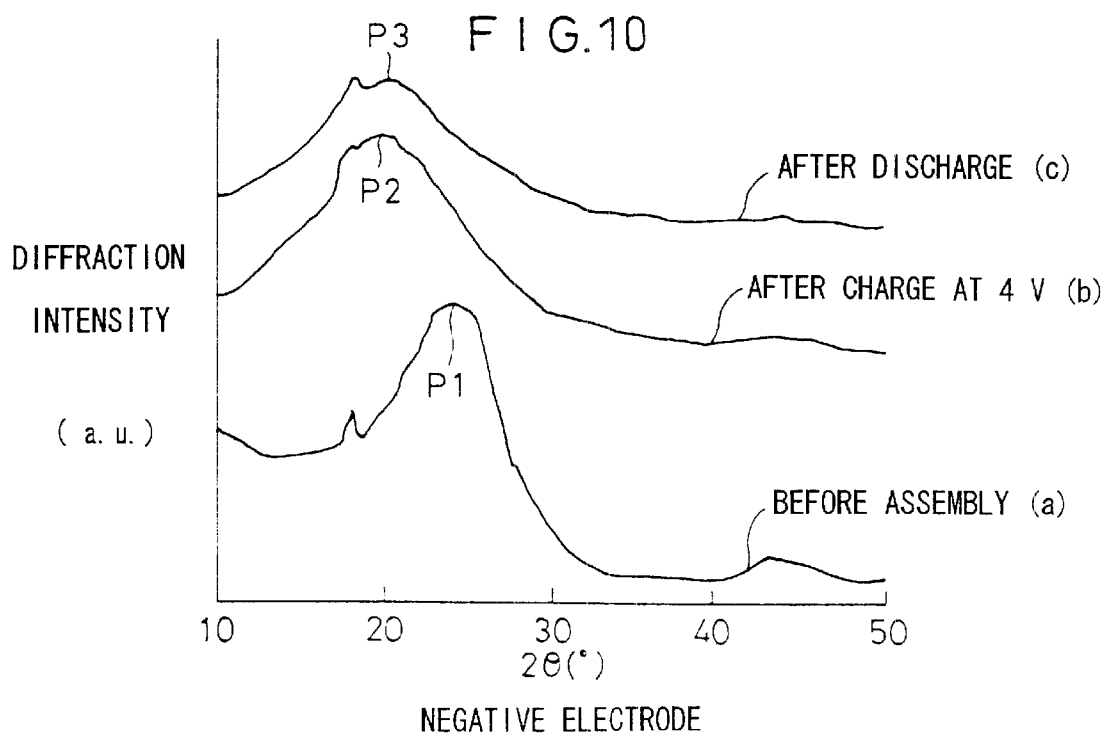

POSITIVE ELECTRODE

NEGATIVE ELECTRODE

ELECTRIC DOUBLE LAYER CAPACITOR AND METHOD FOR PRODUCING THE SAME

BACKGROUND OF THE INVENTION

1. Field of the Invention

The present invention relates to an electric double layer capacitor comprising polarizable electrodes immersed in an organic electrolyte, and a method for producing the same.

2. Description of the Related Art

The conventional electric double layer capacitor, which is based on the use of an organic electrolyte, uses so-called activated carbon having a specific surface area of not less than 1000 m²/g, as an active material for its polarizable electrodes.

The electrostatic capacity is expressed in the electric double layer capacitor as follows. That is, the expression is achieved by a treatment which is called "activation" to artificially form pores in a carbon material, the pores being controlled so that the solute of the organic electrolyte may be adsorbed (see, for example, Japanese Laid-Open Patent Publication No. 9-320906).

However, in the case of the conventional electric double layer capacitor, the electrostatic capacity and the withstand voltage depend on the activation method, and they have had the following limits. That is, in the case of the steam activation method, the electrostatic capacity has had the limit of about 15 F/cc and the withstand voltage has had the limit of about 3 V. In the case of the alkaline activation method, the electrostatic capacity has had the limit of about 20 F/cc and the withstand voltage has had the limit of about 2.5 V.

SUMMARY OF THE INVENTION

The present invention has been made taking the foregoing problem into consideration, an object of which is to provide an electric double layer capacitor which makes it possible to achieve an electrostatic capacity and a withstand voltage exceeding those of the conventional electric double layer capacitor based on the activated carbon system, in the case of the use as a polarizable electrode of the electric double layer capacitor, and a method for producing the same.

According to the present invention, there is provided an electric double layer capacitor comprising polarizable electrodes mainly composed of a carbon material immersed in an organic electrolyte, wherein the carbon material has graphite-like microcrystalline carbon, and an electrostatic capacity is expressed by insertion of ion of a solute of the organic electrolyte into a space between microcrystalline carbon layers of the carbon material.

According to the present invention, it is possible to achieve an electrostatic capacity and a withstand voltage which exceed those of the conventional electric double layer capacitor based on the activated carbon system.

In the present invention, it is preferable that the carbon material is a carbon material having the graphite-like microcrystalline carbon produced by performing a heat treatment at not less than a temperature at which alkali metal vapor is generated, together with at least one of an alkali metal and an alkali metal compound.

Those preferably used as the solute include tetrafluoroborate ($BF_4^-$) or hexafluorophosphate ($PF_6^-$) of quaternary ammonium; tetrafluoroborate ($BF_4^-$) or hexafluorophosphate ($PF_6^-$) of tetraethylammonium ($TEA^+$) or tetrabutylammonium ($TBA^+$); tetrafluoroborate ($BF_4^-$) or hexafluorophosphate ($PF_6^-$) of triethylmethylammonium ($TEMA^+$); tetrafluoroborate ($BF_4^-$) or hexafluorophosphate ($PF_6^-$) of quaternary phosphonium; and tetrafluoroborate ($BF_4^-$) or hexafluorophosphate ($PF_6^-$) of tetraethylphosphonium ($TEP^+$); as well as tetrafluoroborate ($BF_4^-$) or hexafluorophosphate ($PF_6^-$) of imidazolium derivative represented by the following general formula:

wherein $R_1$ and $R_2$ are alkyl groups each having 1 to 5 carbon atoms, and $R_1$ and $R_2$ may be either the same group or different groups; and tetrafluoroborate ($BF_4^-$) or hexafluorophosphate ($PF_6^-$) of 1-ethyl-3-methylimidazolium ($EMI^+$).

Those usable as a solvent of the electrolyte without any problem in the electric double layer capacitor according to the present invention in which the solute ion is inserted into the space between the graphite-like microcrystalline carbon layers contain at least one of propylene carbonate (PC), γ-butyrolactone (GBL), ethylene carbonate (EC), and sulfolane (SL) which are standard solvents for the conventional electric double layer capacitor based on the activated carbon system.

It is also allowable to use a solvent composed of a mixture comprising a primary solvent containing at least one of propylene carbonate (PC), γ-butyrolactone (GBL), ethylene carbonate (EC), and sulfolane (SL); and a secondary solvent containing at least one of dimethyl carbonate (DMC), ethyl methyl carbonate (EMC), and diethyl carbonate (DEC).

In the case of the conventional electric double layer capacitor based on the activated carbon system, the secondary solvent has been added in order to lower the viscosity of the electrolyte and improve the electric conductivity. Also in the case of the electric double layer capacitor according to the present invention in which the solute ion is inserted into the interlayer of the graphite-like microcrystalline carbon, equivalent effects have been observed concerning, for example, reduction of internal resistance.

The secondary solvent may be defined such that if the substance is used singly, the performance as an electrolyte solvent is low, however, it is possible to obtain the performance equivalent or superior to that obtained by using the primary solvent or the secondary solvent alone, by combining the substance with the primary solvent. There is no special limitation for the amount of addition of the secondary solvent, for example, not more than 50%.

According to another aspect of the present invention, there is provided a method for producing an electric double layer capacitor comprising polarizable electrodes immersed in an organic electrolyte, wherein a carbon material for forming the polarizable electrodes is prepared by effecting a first heat treatment step of carbonizing a raw material to allow graphite-like microcrystalline carbon to grow, and a second heat treatment step of performing a heat treatment at not less than a temperature at which alkali metal vapor is generated.

According to the present invention, it is easy to obtain the electric double layer capacitor which makes it possible to achieve the electrostatic capacity and the withstand voltage exceeding those of the conventional electric double layer capacitor based on the activated carbon system.

The raw material, which is usable in the present invention, includes, for example, those based on petroleum (petroleum pitch (tar) and petroleum coke), those based on coal (coal pitch (tar) and coal coke), those based on plant (wood material such as coconut husk and sawdust), and those based on resin (phenol resin, polyvinyl chloride (PVC), polyvinylidene chloride (PVDC), and polyimide). However, there is no limitation to the raw materials described above.

According to still another aspect of the present invention, there is provided a method for producing an electric double layer capacitor comprising polarizable electrodes immersed in an organic electrolyte, wherein a carbon material for forming the polarizable electrodes is a carbon material including graphite-like microcrystalline carbon produced by effecting a heat treatment together with at least one of an alkali metal and an alkali metal compound at not less than a temperature at which alkali metal vapor is generated; and a voltage of not less than a rated voltage is firstly applied between the polarizable electrodes after assembling the electric double layer capacitor so that ions of a solute of the organic electrolyte are forcibly inserted into a space between microcrystalline carbon layers composed of the carbon material to express an electrostatic capacity.

According to the present invention, it is easy to obtain the electric double layer capacitor which makes it possible to achieve the electrostatic capacity and the withstand voltage exceeding those of the conventional electric double layer capacitor based on the activated carbon system.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 2A to 2D show production steps illustrating the process for producing an electric double layer capacitor of the unit capacitor type according to an embodiment of the present invention;

FIG. 8 shows a table illustrating electrostatic capacities of electric double layer capacitors according to Examples 1 to 7 and Comparative Examples 1 and 2;

FIG. 9 shows a characteristic illustrating the X-ray diffraction intensity of a positive polarizable electrode after a predetermined treatment, concerning the electric double layer capacitor according to Example 1;

FIG. 10 shows a characteristic illustrating the X-ray diffraction intensity of a negative polarizable electrode after the predetermined treatment, concerning the electric double layer capacitor according to Example 1;

DESCRIPTION OF THE PREFERRED EMBODIMENTS

Explanation will be made below with reference to FIGS. 1 to 12 for illustrative embodiments concerning the electric double layer capacitor and the method for producing the same according to the present invention.

Figure 1:
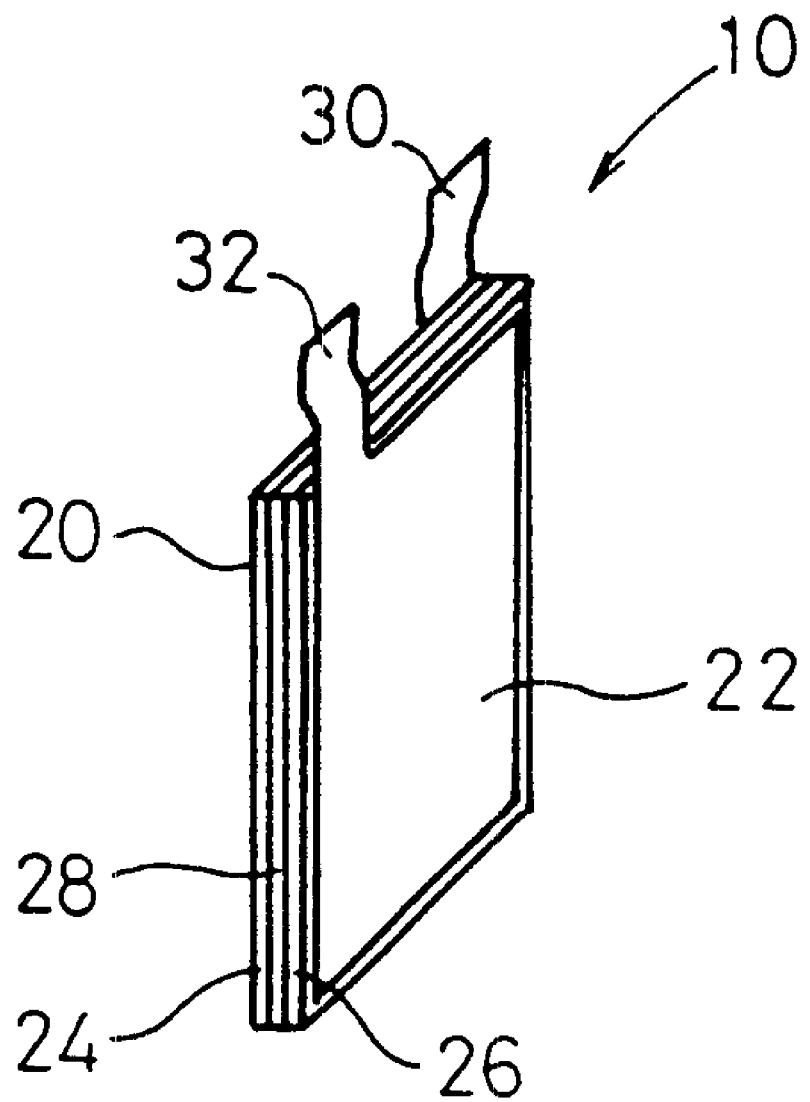
FIG. 1 shows an illustrative arrangement of an electric double layer capacitor of the unit electrode cell type according to an embodiment of the present invention.

At first, the electric double layer capacitor according to the embodiment of the present invention includes, for example, the type of a unit electrode cell 10 as shown in FIG. 1 and the type of a unit capacitor cell 12 as shown in FIG. 2D.

As shown in FIG. 1, the unit electrode cell 10 comprises a positive polarizable electrode 24 and a negative polarizable electrode 26 which are formed on two collectors 20, 22 respectively. The unit electrode cell 10 further comprises a separator 28 which is interposed between the polarizable electrodes 24, 26. In this embodiment, an aluminum foil is used for the collectors 20, 22 respectively, and a carbon material according to the embodiment of the present invention is used for the polarizable electrodes 24, 26 respectively.

Electrode leads 30, 32, each of which is made of an identical material, are formed at upper portions of the collectors 20, 22 respectively. The electric double layer capacitor is constructed by immersing the unit electrode cell 10, for example, in an organic electrolyte.

On the other hand, the type of the unit capacitor cell 12 is produced in accordance with the steps as shown in FIGS. 2A to 2D. At first, for example, a collector 20 (22), which is provided with an electrode lead 30 (32), is interposed by a sheet of a polarizable electrode 24 (26). These components are further interposed by a separator 28 to produce an electrode assembly 46. A large number of electrode assemblies 46 are stacked so that the positive polarizable electrodes 24 and the negative polarizable electrodes 26 are alternately stacked respectively. The electrode leads 30 (or 32) concerning the same polarity are electrically connected to produce a stack 50.

After that, the stack 50 is accommodated in an air-tight container 52 containing an organic electrolyte 40, and thus the stack 50 is impregnated with the organic electrolyte 40. The positive electrode lead 30 and the negative electrode lead 32 are electrically connected to a positive terminal 54 and a negative terminal 56 which are attached to upper portions of the air-tight container 52 respectively. Thus, a unit capacitor cell 12 is completed.

Figure 3:
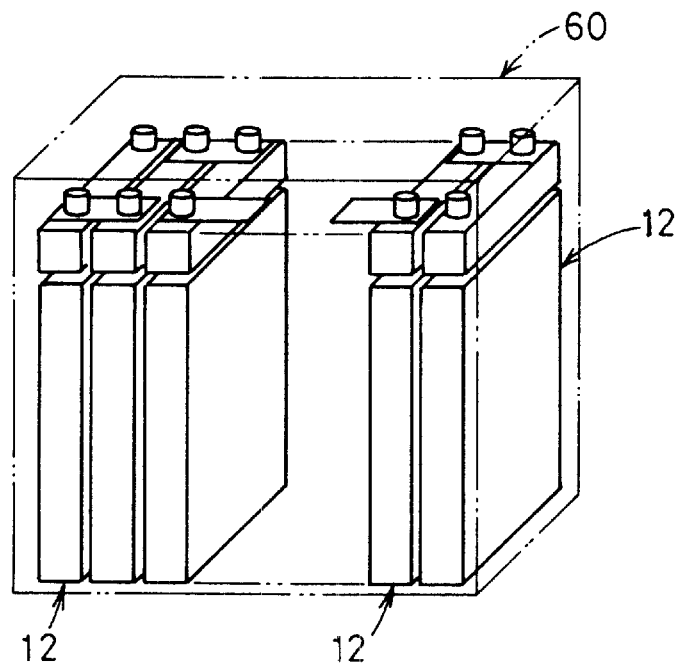
FIG. 3 illustrates a state in which the electric double layer capacitors of the unit capacitor type according to the embodiment of the present invention are combined to produce an electric double layer capacitor module.

After that, a large number of unit capacitor cells 12 are stacked in parallel to one another. Accordingly, an electric double layer capacitor module 60 is produced as shown in FIG. 3.

Both of the type of the unit electrode cell 10 shown in FIG. 1 and the type of the unit capacitor cell 12 shown in FIG. 2D are of the flat plate type, and they are characterized in that a high degree of charge can be effected, and a large areal size can be easily obtained.

Figure 4:
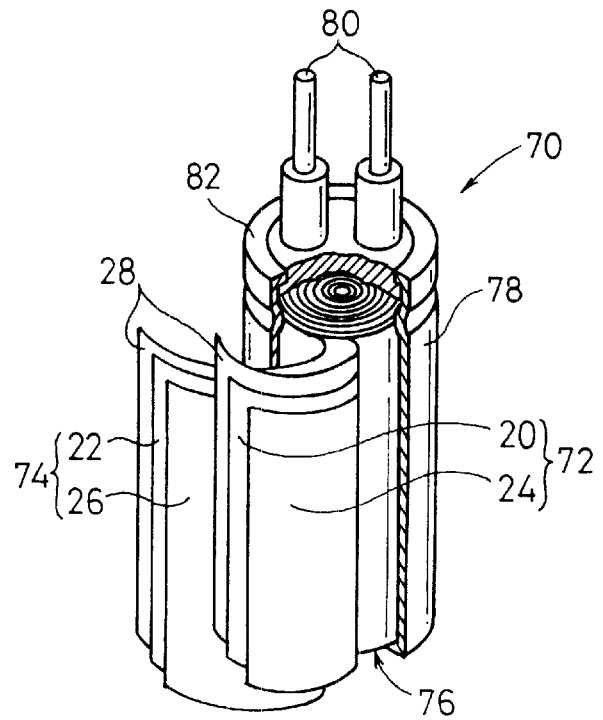
FIG. 4 shows a perspective view illustrating, with partial breakage, an electric double layer capacitor of the wound type according to an embodiment of the present invention.

In addition to the flat type electric double layer capacitors as described above, a wound type electric double layer capacitor 70 is also available as shown in FIG. 4. The electric double layer capacitor 70 of the wound type includes a wound core 76 composed of a positive electrode sheet 72 which comprises a positive polarizable electrode 24 formed on a collector 20 and a negative electrode sheet 74 which comprises a negative polarizable electrode 26 formed on the collector 22, the positive electrode sheet 72 and the negative electrode sheet 74 being wound to have a cylindrical configuration with a separator 28 interposed therebetween.

The wound core 76 is accommodated, for example, in a cylindrical aluminum case 78 which is previously filled with an organic electrolyte 40 (not shown). The aluminum case 78 is covered with a seal plate 82 which is attached with electrode terminals 80. Thus, a wound type electric double layer capacitor 70 is completed.

The carbon material, which is used for the electric double layer capacitor according to the embodiment of the present invention, is a carbon material including the graphite-like microcrystalline carbon produced by performing a heat treatment at not less than a temperature at which alkali metal vapor is generated, together with at least one of an alkali metal and an alkali metal compound.

Figure 5:
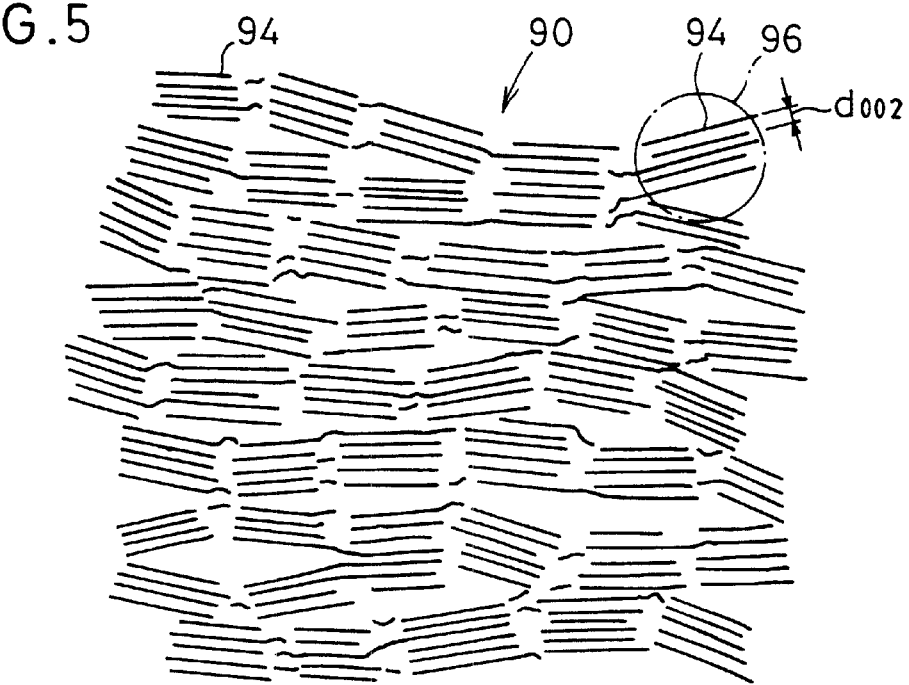
FIG. 5 schematically illustrates a structure of easily graphitizable carbon for constructing the carbon material used for the electric double layer capacitor according to the embodiment of the present invention.
Figure 6:
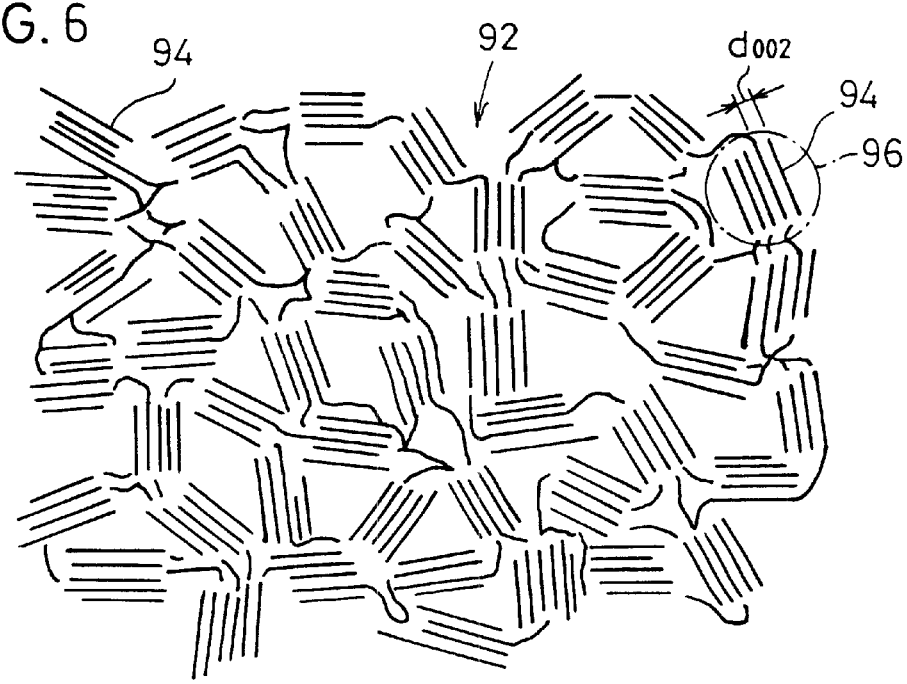
FIG. 6 schematically illustrates a structure of hardly graphitizable carbon for constructing the carbon material used for the electric double layer capacitor according to the embodiment of the present invention.

The carbon material having the graphite-like microcrystalline carbon includes those which are easily graphitizable as shown in FIG. 5 (easily graphitizable carbon 90) and those which are hardly graphitizable as shown in FIG. 6 (hardly graphitizable carbon 92). As shown in FIGS. 5 and 6, each of the easily graphitizable carbon 90 and the hardly graphitizable carbon 92 has a structure in which a large number of structural elements 96 composed of the microcrystalline carbon 94 stacked in a layered manner are randomly arranged. In the following description, this structure is referred to as "multigraphite structure".

The easily graphitizable carbon 90 resembles graphite in a two-dimensional viewpoint, and it has its net planes which are stacked in parallel at equal intervals. However, the layer plane is not completely oriented with respect to the vertical direction, and the layers are irregularly stacked. On the other hand, the hardly graphitizable carbon 92 is composed of a space lattice comprising carbon hexagons which are irregularly intersected and connected, in which the graphite layer plane is distorted.

The carbon material according to the embodiment of the present invention is used for the polarizable electrodes 24, 26 to construct the electric double layer capacitor 70 of the type of the unit electrode cell 10 shown in FIG. 1, the type of the unit capacitor cell 12 shown in FIG. 2D, or the wound type shown in FIG. 4. In this arrangement, the electrostatic capacity is expressed by the insertion of the solute ion of the organic electrolyte 40 into the space between the layers of the microcrystalline carbon 94 of the carbon material. Especially, in the embodiment of the present invention, a voltage (for example, 4 V), which is not less than a rated voltage (for example, 3 V), is firstly applied between the polarizable electrodes 24, 26 after assembling the electric double layer capacitor. Thus, the electrostatic capacity is expressed.

In this embodiment, it is preferable that the solute of the organic electrolyte 40 is tetrafluoroborate ($BF_4^-$) or hexafluorophosphate ($PF_6^-$) of quaternary ammonium, tetrafluoroborate ($BF_4^-$) or hexafluorophosphate ($PF_6^-$) of tetraethylammonium ($TEA^+$) or tetrabutylammonium ($TBA^+$), tetrafluoroborate ($BF_4^-$) or hexafluorophosphate ($PF_6^-$) of triethylmethylammonium ($TEMA^+$), tetrafluoroborate ($BF_4^-$) or hexafluorophosphate ($PF_6^-$) of quaternary phosphonium, or tetrafluoroborate ($BF_4^-$) or hexafluorophosphate ($PF_6^-$) of tetraethylphosphonium ($TEP^+$). Alternatively it is preferable that the solute of the organic electrolyte 40 is tetrafluoroborate ($BF_4^-$) or hexafluorophosphate ($PF_6^-$) of imidazolium derivative represented by the following general formula:

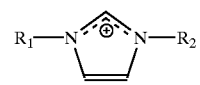

wherein $R_1$ and $R_2$ are alkyl groups each having a number of carbon atom or atoms of 1 to 5, and $R_1$ and $R_2$ may be either the same group or different groups, or tetrafluoroborate ($BF_4^-$) or hexafluorophosphate ($PF_6^-$) of 1-ethyl-3-methylimidazolium ($EMI^+$).

It is preferable that the solvent of the organic electrolyte contains at least one of propylene carbonate (PC), γ-butyrolactone (GBL), ethylene carbonate (EC), and sulfolane (SL).

It is also allowable to use a solvent composed of a mixture comprising a primary solvent containing at least one of propylene carbonate (PC), γ-butyrolactone (GBL), ethylene carbonate (EC), and sulfolane (SL), and a secondary solvent containing at least one of dimethyl carbonate (DMC), ethyl methyl carbonate (EMC), and diethyl carbonate (DEC).

The electric double layer capacitor according to the embodiment of the present invention makes it possible to achieve the electrostatic capacity and the withstand voltage exceeding those of the conventional electric double layer capacitor based on the activated carbon system.

The difference in characteristic between the electric double layer capacitor according to the embodiment of the present invention and the conventional electric double layer capacitor based on the activated carbon system will be explained below on the basis of Examples 1 to 7 and Comparative Examples 1 and 2.

Examples 1 to 7 are constructed in conformity with the electric double layer capacitor according to the embodiment of the present invention, while Comparative Examples 1 and 2 are constructed in conformity with the conventional electric double layer capacitor based on the activated carbon system.

EXAMPLE 1

Petroleum coke in an amount of 1 kg was heat-treated at 800° C. for 5 hours in a nitrogen atmosphere, followed by being cooled to the room temperature. The temperature-raising/lowering speed was 100° C./hour during this treatment. After that, an obtained carbon of the petroleum coke was pulverized to have an average grain size of 40 μm. An obtained carbon powder in an amount of 200 g was mixed with 400 g of potassium hydroxide, followed by performing a heat treatment at 800° C. for 2 hours in a nitrogen atmosphere. The temperature-raising/lowering speed was 300° C./hour during this treatment.

After being cooled to the room temperature, the carbon powder was washed with water to remove any alkaline content, followed by being dried. The specific surface area of the carbon powder was measured in accordance with the $N_2$ BET method. As a result, the specific surface area was 344 m²/g.

The carbon powder in an amount of 1 g was mixed, kneaded, and rolled together with 0.1 g of carbon black as a conductive material and 0.1 g of PTFE (polytetrafluoroethylene) as a binder to prepare a sheet having a thickness of 0.5 mm. The multigraphite structure exhibited by the obtained sheet-shaped carbon material is the easily graphitizable structure as shown in FIG. 5.

The sheet-shaped carbon material was stamped to have a diameter of 20 mm to be used as polarizable electrodes 24, 26 which were combined with collectors 20, 22 and a separator 28 and which were impregnated with an organic electrolyte 40 (obtained by using propylene carbonate as a solvent and adding $TEA.BF_4$ as a solute to give a concentration of 1 mol/liter) to prepare an electric double layer capacitor (for example, the unit electrode type) according to Example 1. The electric double layer capacitor was assembled in a glove box in which an argon atmosphere was successfully maintained at a dew point of not more than −80° C.

Figure 7:
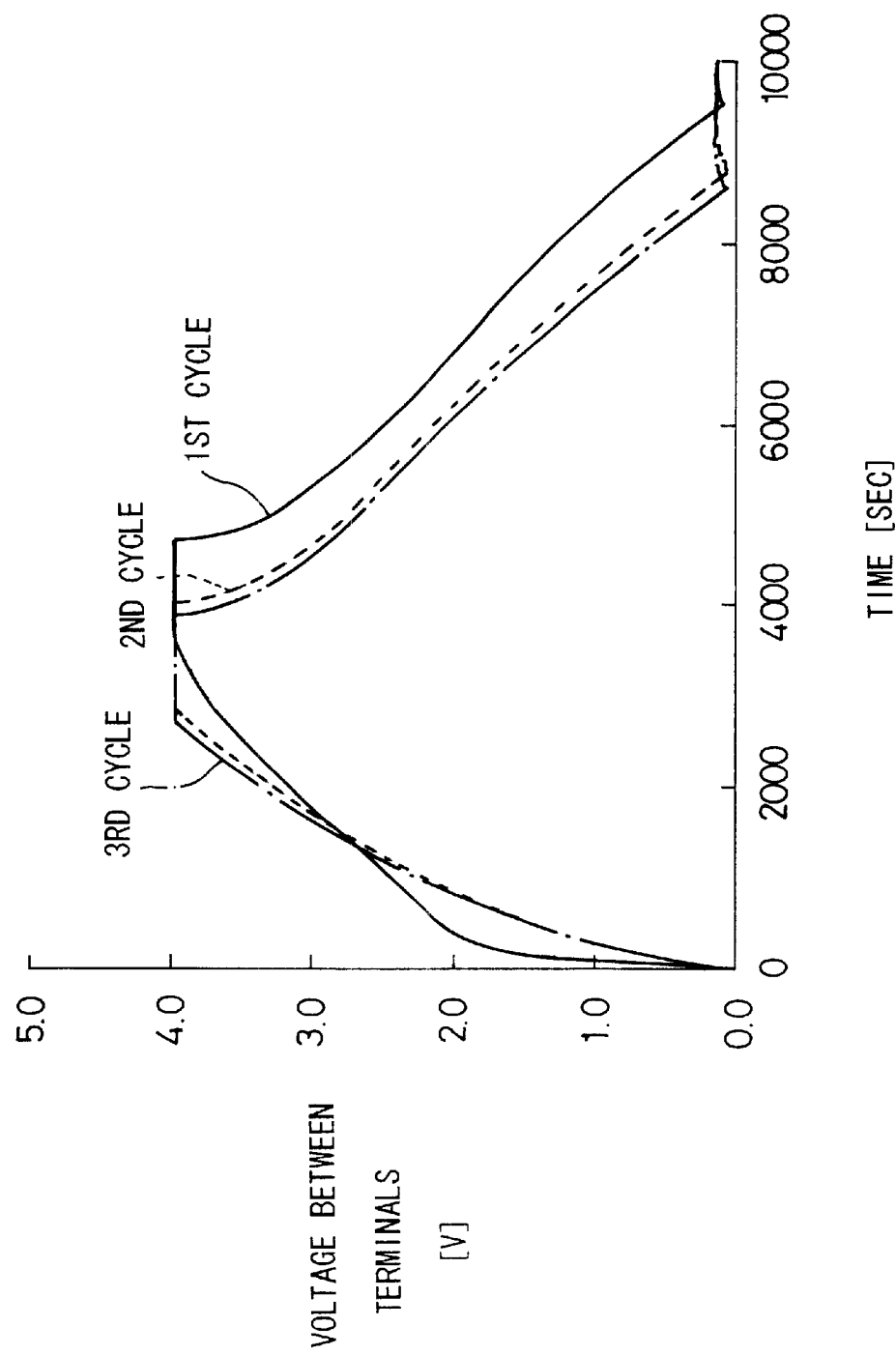
FIG. 7 shows a charge/discharge characteristic of an electric double layer capacitor (of the unit electrode cell type) according to Example 1.

The charge/discharge process was performed for the obtained electric double layer capacitor up to 4 V with a charge current of 10 mA and a discharge current of 5 mA. FIG. 7 shows a charge/discharge characteristic up to the 3rd cycle. The measurement result for the electrostatic capacity was 27 F/cc (4 V) as shown in a column for Example 1 in FIG. 8.

FIGS. 9 and 10 show the result of measurement for the X-ray diffraction intensity of the positive and negative polarizable electrodes after the predetermined treatment for two sets of prepared electric double layer capacitors having the same arrangement as that described above. In FIGS. 9 and 10, the curve "a" indicates the X-ray diffraction intensity of the carbon material obtained before the electric double layer capacitor was assembled. The curve "b" indicates the X-ray diffraction intensity obtained when the electric double layer capacitor was assembled, the charge of the 1st cycle was performed, and then the electric double layer capacitor was disassembled in the charged state. The curve "c" indicates the X-ray diffraction intensity obtained when the charge of the 1st cycle was performed followed by the discharge, and then the electric double layer capacitor was disassembled in the discharged state. The peak existing at a position of 2θ of about 18° is a peak which indicates the presence of PTFE as the binder.

In FIGS. 9 and 10, the peaks P1, P2, P3, which exist at the positions of 2θ of about 20° to 25°, correspond to the peak originating from the interlayer of the graphite-like microcrystalline carbon 94. That is, the larger the interlayer distance $d_{002}$ is, the lower the angle at which the peak exists is.

Specifically, the following results were obtained for the peak positions P1 to P3 of the carbon material concerning Example 1 and the interlayer distance $d_{002}$ of the microcrystalline carbon 94:
Positive electrode:
   before assembly (P1): 2θ=23.87° ($d_{002}$=0.362)
   after charge at 4 V (P2): 2θ=20.04° ($d_{002}$=0.374)
   after discharge (P3); 2θ=21.60° ($d_{002}$=0.397)
Negative electrode:
   before assembly (P1): 2θ=23.87° ($d_{002}$=0.362)
   after charge at 4 V (P2): 2θ=19.22° ($d_{002}$=0.442)
   after discharge (P3): 2θ=20.00° ($d_{002}$=0.426)
According to FIGS. 9 and 10, the peak P2, which originates from the interlayer of the graphite-like microcrystalline carbon 94 and which is obtained after the first charge, is disposed on the low angle side, concerning both of the positive electrode and the negative electrode. Therefore, it has been confirmed that the interlayer is greatly widened as compared with that before the assembling, and the interlayer is narrowed a little after the discharge.

According to this fact, it is understood that the solute ion of the organic electrolyte 40 is inserted into the space between the layers of the graphite-like microcrystalline carbon 94 as a result of the charge of the electric double layer capacitor, and the solute ion is detached during the discharge.

EXAMPLE 2

Coal coke in an amount of 1 kg was heat-treated at 900° C. for 3 hours in a nitrogen atmosphere, followed by being cooled to the room temperature. The temperature-raising/lowering speed was 100° C./hour during this treatment. After that, an obtained carbon of the coal coke was pulverized to have an average grain size of 40 μm. An obtained carbon powder in an amount of 200 g and metallic sodium in an amount of 200 g were placed in separate vessels which had no cover and which were in an open state respectively, and they were arranged adjacently to perform a heat treatment at 750° C. for 12 hours in a nitrogen atmosphere. The temperature-raising/lowering speed was 300° C./hour during this treatment.

After being cooled to the room temperature, the carbon powder was washed with water to remove any adhering alkaline content, followed by being dried. The specific surface area of the carbon powder was measured in accordance with the $N_2$ BET method. As a result, the specific surface area was 50 m²/g.

The carbon powder in an amount of 1 g was mixed, kneaded, and rolled together with 0.1 g of carbon black as a conductive material and 0.1 g of PTFE (polytetrafluoroethylene) as a binder to prepare a sheet having a thickness of 0.5 mm. The multigraphite structure exhibited by the obtained sheet-shaped carbon material is the easily graphitizable structure as shown in FIG. 5.

The sheet-shaped carbon material was stamped to have a diameter of 20 mm to be used as polarizable electrodes 24, 26 which were combined with collectors 20, 22 and a separator 28 and which were impregnated with an organic electrolyte 40 (obtained by using propylene carbonate as a solvent and adding $TEA.BF_4$ as a solute to give a concentration of 1 mol/liter) to prepare an electric double layer capacitor (for example, the unit electrode type) according to Example 2. The electric double layer capacitor was assembled in a glove box in which an argon atmosphere was successfully maintained at a dew point of not more than −80° C.

The charge/discharge process was performed for the obtained electric double layer capacitor up to 4 V with a charge current of 10 mA and a discharge current of 5 mA. The measurement result for the electrostatic capacity was 35 F/cc (4 V) as shown in a column for Example 2 in FIG. 8.

EXAMPLE 3

Phenol resin in an amount of 1 kg was heat-treated at 1600° C. for 24 hours in a nitrogen atmosphere, followed by being cooled to the room temperature. The temperature-raising/lowering speed was 100° C./hour during this treatment. After that, an obtained carbon of the phenol resin was pulverized to have an average grain size of 40 μm. An obtained carbon powder in an amount of 200 g was mixed with 400 g of potassium carbonate to perform a heat treatment at 900° C. for 2 hours in a nitrogen atmosphere. The temperature-raising/lowering speed was 300° C./hour during this treatment.

After being cooled to the room temperature, the carbon powder was washed with water to remove any alkaline content, followed by being dried. The specific surface area of the carbon powder was measured in accordance with the $N_2$ BET method. As a result, the specific surface area was 705 m$^2$/g.

The carbon powder in an amount of 1 g was mixed, kneaded, and rolled together with 0.1 g of carbon black as a conductive material and 0.1 g of PTFE (polytetrafluoroethylene) as a binder to prepare a sheet having a thickness of 0.5 mm. The multigraphite structure exhibited by the obtained sheet-shaped carbon material is the hardly graphitizable structure as shown in FIG. 6.

The sheet-shaped carbon material was stamped to have a diameter of 20 mm to be used as polarizable electrodes 24, 26 which were combined with collectors 20, 22 and a separator 28 and which were impregnated with an organic electrolyte 40 (obtained by using propylene carbonate as a solvent and adding TEA.BF$_4$ as a solute to give a concentration of 1 mol/liter) to prepare an electric double layer capacitor (for example, the unit electrode type) according to Example 3. The electric double layer capacitor was assembled in a glove box in which an argon atmosphere was successfully maintained at a dew point of not more than −80° C.

The charge/discharge process was performed for the obtained electric double layer capacitor up to 4 V with a charge current of 10 mA and a discharge current of 5 mA. The measurement result for the electrostatic capacity was 22 F/cc (4 V) as shown in a column for Example 3 in FIG. 8.

EXAMPLE 4

Petroleum pitch in an amount of 1 kg was heat-treated at 800° C. for 2 hours in a nitrogen atmosphere, followed by being cooled to the room temperature. The temperature-raising/lowering speed was 100° C./hour during this treatment. After that, an obtained carbon of the petroleum pitch was pulverized to have an average grain size of 40 μm. An obtained carbon powder in an amount of 200 g was mixed with 400 g of potassium hydroxide to perform a heat treatment at 800° C. for 2 hours in a nitrogen atmosphere. The temperature-raising/lowering speed was 300° C./hour during this treatment.

After being cooled to the room temperature, the carbon powder was washed with water to remove any adhering alkaline content, followed by being dried. The specific surface area of the carbon powder was measured in accordance with the $N_2$ BET method. As a result, the specific surface area was 412 m$^2$/g.

The carbon powder in an amount of 1 g was mixed, kneaded, and rolled together with 0.1 g of carbon black as a conductive material and 0.1 g of PTFE (polytetrafluoroethylene) as a binder to prepare a sheet having a thickness of 0.5 mm.

The sheet-shaped carbon material was stamped to have a diameter of 20 mm to be used as polarizable electrodes 24, 26 which were combined with collectors 20, 22 and a separator 28 and which were impregnated with an organic electrolyte 40 (obtained by using propylene carbonate as a solvent and adding TEMA.BF$_4$ as a solute to give a concentration of 2 mols/liter) to prepare an electric double layer capacitor (for example, the unit electrode type) according to Example 4. The electric double layer capacitor was assembled in a glove box in which an argon atmosphere was successfully maintained at a dew point of not more than −80° C.

The charge/discharge process was performed for the obtained electric double layer capacitor up to 4 V with a charge current of 10 mA and a discharge current of 5 mA. The measurement result for the electrostatic capacity was 28.5 F/cc (4 V) as shown in a column for Example 4 in FIG. 8.

EXAMPLE 5

Coal coke in an amount of 1 kg was heat-treated at 900° C. for 3 hours in a nitrogen atmosphere, followed by being cooled to the room temperature. The temperature-raising/lowering speed was 100° C./hour during this treatment. After that, an obtained carbon of the coal coke was pulverized to have an average grain size of 40 μm. An obtained carbon powder in an amount of 200 g and metallic potassium in an amount of 200 g were placed in separate vessels which had no cover and which were in an open state respectively, and they were arranged adjacently to perform a heat treatment at 800° C. for 2 hours in a nitrogen atmosphere. Thus, the carbon was exposed to the potassium vapor. The temperature-raising/lowering speed was 300° C./hour during this treatment.

After being cooled to the room temperature, the carbon powder was washed with water to remove any adhering alkaline content, followed by being dried. The specific surface area of the carbon powder was measured in accordance with the $N_2$ BET method. As a result, the specific surface area was 52 m$^2$/g.

The carbon powder in an amount of 1 g was mixed, kneaded, and rolled together with 0.1 g of carbon black as a conductive material and 0.1 g of PTFE (polytetrafluoroethylene) as a binder to prepare a sheet having a thickness of 0.5 mm.

The sheet-shaped carbon material was stamped to have a diameter of 20 mm to be used as polarizable electrodes 24, 26 which were combined with collectors 20, 22 and a separator 28 and which were impregnated with an organic electrolyte 40 (obtained by using a mixture of propylene carbonate and γ-butyrolactone (weight ratio: 50:50) as a solvent and adding TEP.BF$_4$ as a solute to give a concentration of 1 mol/liter) to prepare an electric double layer capacitor (for example, the unit electrode type) according to Example 5. The electric double layer capacitor was assembled in a glove box in which an argon atmosphere was successfully maintained at a dew point of not more than −80° C.

The charge/discharge process was performed for the obtained electric double layer capacitor up to 4 V with a charge current of 10 mA and a discharge current of 5 mA. The measurement result for the electrostatic capacity was 31 F/cc (4 V) as shown in a column for Example 5 in FIG. 8.

EXAMPLE 6

Coal coke in an amount of 1 kg was heat-treated at 900° C. for 3 hours in a nitrogen atmosphere, followed by being cooled to the room temperature. The temperature-raising/lowering speed was 100° C./hour during this treatment. After that, an obtained carbon of the coal coke was pulverized to have an average grain size of 40 μm. An obtained carbon powder in an amount of 200 g and metallic potassium in an amount of 200 g were placed in separate vessels which had no cover and which were in an open state respectively, and they were arranged adjacently to perform a heat treatment at 800° C. for 2 hours in a nitrogen atmosphere. Thus, the carbon was exposed to the potassium vapor. The temperature-raising/lowering speed was 300° C./hour during this treatment.

After being cooled to the room temperature, the carbon powder was washed with water to remove any adhering alkaline content, followed by being dried. The specific surface area of the carbon powder was measured in accordance with the $N_2$ BET method. As a result, the specific surface area was 52 m²/g.

The carbon powder in an amount of 1 g was mixed, kneaded, and rolled together with 0.1 g of carbon black as a conductive material and 0.1 g of PTFE (polytetrafluoroethylene) as a binder to prepare a sheet having a thickness of 0.5 mm.

The sheet-shaped carbon material was stamped to have a diameter of 20 mm to be used as polarizable electrodes 24, 26 which were combined with collectors 20, 22 and a separator 28 and which were impregnated with an organic electrolyte 40 (obtained by using a mixture of propylene carbonate, γ-butyrolactone, and dimethyl carbonate (weight ratio: 30:30:40) as a solvent and adding $TEP.BF_4$ as a solute to give a concentration of 1 mol/liter) to prepare an electric double layer capacitor (for example, the unit electrode type) according to Example 6. The electric double layer capacitor was assembled in a glove box in which an argon atmosphere was successfully maintained at a dew point of not more than −80° C.

The charge/discharge process was performed for the obtained electric double layer capacitor up to 4 V with a charge current of 10 mA and a discharge current of 5 mA. The measurement result for the electrostatic capacity was 32.5 F/cc (4 V) as shown in a column for Example 6 in FIG. 8.

EXAMPLE 7

Coconut husk in an amount of 1 kg was heat-treated at 1700° C. for 24 hours in a nitrogen atmosphere, followed by being cooled to the room temperature. The temperature-raising/lowering speed was 100° C./hour during this treatment. After that, an obtained carbon of the coconut husk was pulverized to have an average grain size of 40 μm. An obtained carbon powder in an amount of 200 g was mixed with potassium carbonate in an amount of 400 g to perform a heat treatment at 900° C. for 2 hours in a nitrogen atmosphere. The temperature-raising/lowering speed was 300° C./hour during this treatment.

After being cooled to the room temperature, the carbon powder was washed with water to remove any adhering alkaline content, followed by being dried. The specific surface area of the carbon powder was measured in accordance with the $N_2$ BET method. As a result, the specific surface area was 754 m²/g.

The carbon powder in an amount of 1 g was mixed, kneaded, and rolled together with 0.1 g of carbon black as a conductive material and 0.1 g of PTFE (polytetrafluoroethylene) as a binder to prepare a sheet having a thickness of 0.5 mm.

The sheet-shaped carbon material was stamped to have a diameter of 20 mm to be used as polarizable electrodes 24, 26 which were combined with collectors 20, 22 and a separator 28 and which were impregnated with an organic electrolyte 40 (obtained by using propylene carbonate as a solvent and adding $EMI.PF_6$ as a solute to give a concentration of 3.5 mols/liter) to prepare an electric double layer capacitor (for example, the unit electrode type) according to Example 7. The electric double layer capacitor was assembled in a glove box in which an argon atmosphere was successfully maintained at a dew point of not more than −80° C.

The charge/discharge process was performed for the obtained electric double layer capacitor up to 4 V with a charge current of 10 mA and a discharge current of 5 mA. The measurement result for the electrostatic capacity was 25 F/cc (4 V) as shown in a column for Example 7 in FIG. 8.

Comparative Example 1

Petroleum coke was pulverized to have an average grain size of 40 μm. An obtained carbon powder in an amount of 200 g was mixed with 400 g of potassium hydroxide, followed by performing a heat treatment at 800° C. for 2 hours in a nitrogen atmosphere. The temperature-raising/lowering speed was 300° C./hour during this treatment.

After being cooled to the room temperature, the carbon powder was washed with water to remove any alkaline content, followed by being dried. The specific surface area of the carbon powder was measured in accordance with the $N_2$ BET method. As a result, the specific surface area was 2032 m²/g.

An electric double layer capacitor was produced by using the carbon powder under the same condition as that used in Example 1. The charge/discharge process was tried up to 4 V with a charge current of 10 mA and a discharge current of 5 mA. However, the organic electrolyte 40 was decomposed at a voltage exceeding about 3 V, and a large amount of gas dominantly containing $H_2$ and $CO_2$ was produced. As a result, it was impossible to perform the continuous charge/discharge.

Therefore, the electrostatic capacity was measured at 2.5 V by using another electric double layer capacitor produced under the same condition. The measurement result was 21 F/cc (2.5 V) as shown in a column for Comparative Example 1 in FIG. 8.

Figure 11:
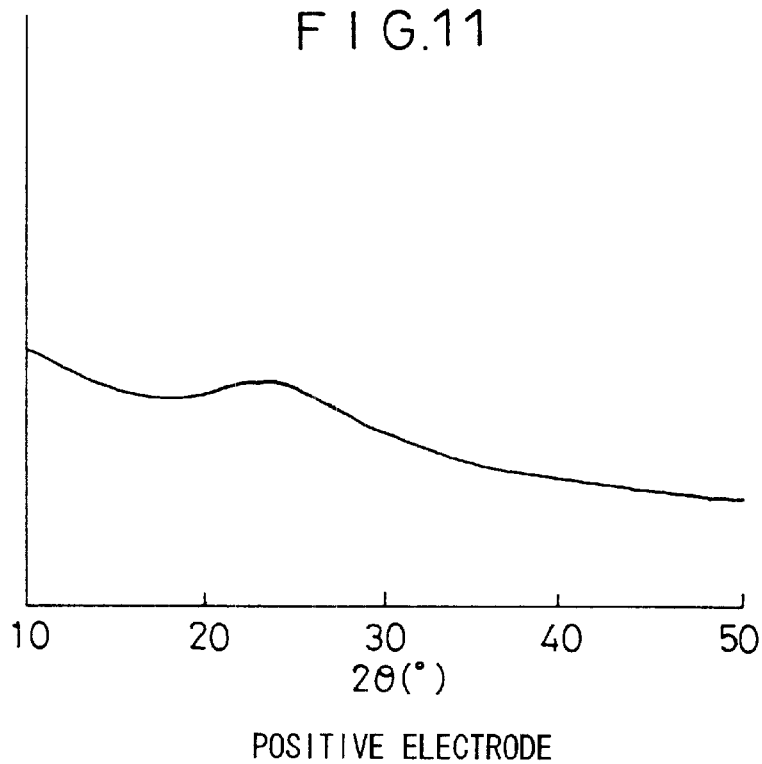
FIG. 11 shows a characteristic illustrating the X-ray diffraction intensity of a positive polarizable electrode after the predetermined treatment, concerning the electric double layer capacitor according to Comparative Example 1.
Figure 12:
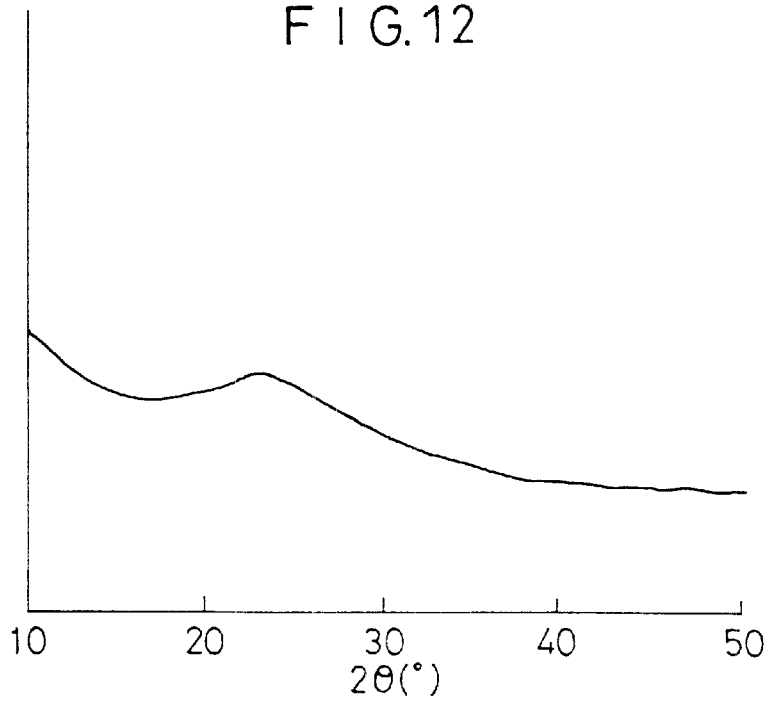
FIG. 12 shows a characteristic illustrating the X-ray diffraction intensity of a negative polarizable electrode after the predetermined treatment, concerning the electric double layer capacitor according to Comparative Example 1.

FIGS. 11 and 12 show the result of measurement for the X-ray diffraction intensity of the positive and negative polarizable electrodes after the predetermined treatment for two sets of prepared electric double layer capacitors having the same arrangement as that described above. In FIGS. 11 and 12, the same curve, i.e. the curve having a broad peak with a center of 2θ=22.0° was obtained for the X-ray diffraction intensity in all of the three states, i.e., the X-ray diffraction intensity of the carbon material obtained before the electric double layer capacitor was assembled, the X-ray diffraction intensity obtained when the electric double layer capacitor was assembled, the charge of the 1st cycle was performed, and then the electric double layer capacitor was disassembled in the charged state, and the X-ray diffraction intensity obtained when the charge of the 1st cycle was performed followed by the discharge, and then the electric double layer capacitor was disassembled in the discharged state. In this case, the interlayer distance $d_{002}$ of the microcrystalline carbon 94 was 0.391 nm.

According to this fact, it is understood that the solute ion is not inserted into the space between the layers of the microcrystalline carbon 94, and the operation is effected in the same manner as in the conventional activated carbon.

Comparative Example 2

Phenol resin in an amount of 1 kg was subjected to a heat treatment performed at 800° C. for 24 hours in a nitrogen atmosphere. The temperature-raising/lowering speed was 100° C./hour during this treatment. After that, an obtained carbon of the phenol resin was pulverized to have an average grain size of 40 μm. An obtained carbon powder in an amount of 200 g was mixed with 400 g of potassium carbonate to perform a heat treatment at 900° C. for 2 hours in a nitrogen atmosphere. The temperature-raising/lowering speed was 300° C./hour during this treatment.

After being cooled to the room temperature, the carbon powder was washed with water to remove any alkaline content, followed by being dried. The specific surface area of the carbon powder was measured in accordance with the $N_2$ BET method. As a result, the specific surface area was 1810 $m^2/g$.

An electric double layer capacitor was produced by using the carbon powder under the same condition as that used in Example 2. The charge/discharge process was tried up to 4 V with a charge current of 10 mA and a discharge current of 5 mA. However, the organic electrolyte 40 was decomposed at a voltage exceeding about 3 V, and a large amount of gas dominantly containing $CO_2$ was produced. As a result, it was impossible to perform the continuous charge/discharge.

Therefore, the electrostatic capacity was measured at 2.5 V by using another electric double layer capacitor produced under the same condition. The measurement result was 17 F/cc (2.5 V) as shown in a column for Comparative Example 2 in FIG. 8.

CONSEQUENT REMARKS

According to the fact described above, the electric double layer capacitor according to the embodiment of the present invention, in which the electrostatic capacity is expressed by the insertion of the solute ion of the organic electrolyte 40 into the space between the layers of the graphite-like microcrystalline carbon 94, is more excellent in both of the electrostatic capacity and the withstand voltage than the conventional electric double layer capacitor based on the use of the activated carbon, probably because of the following reason.

That is, in the case of the conventional activated carbon, a large amount of acidic functional groups are formed at terminals of the graphite-like microcrystalline carbon 94, because the pores for adsorbing the solute ion of the organic electrolyte 40 are formed by utilizing the oxidation reaction based on the use of stream and alkali. The electric double layer capacitor, which uses the conventional activated carbon, is restricted for the withstand voltage, because the acidic functional groups participate in electrolysis of the electrolyte during the charge process.

On the other hand, in the case of the electric double layer capacitor according to the embodiment of the present invention, the electrostatic capacity is expressed by the insertion of the solute ion of the organic electrolyte 40 into the space between the layers of the graphite-like microcrystalline carbon 94. Therefore, it is enough to provide the pore in an amount necessary for the organic electrolyte 40 to advance into the inside of the carbon particles. Accordingly, the amount of acidic functional groups is small, and hence the withstand voltage is improved.

In order to produce the carbon material to be used for the electric double layer capacitor according to the embodiment of the present invention, the following condition is indispensable. That is, the heat treatment is performed at a temperature which is not less than the temperature at which the vapor of alkali metal is generated, together with at least one of the alkali metal or the alkali metal compound.

The heat treatment is preferably performed at not less than 800° C. when potassium hydroxide is used, at not less than 890° C. when potassium carbonate is used, at not less than 900° C. when sodium hydroxide and sodium carbonate are used, or at not less than 620° C. when lithium hydroxide and lithium carbonate are used.

On the other hand, when the alkali metal is used, then it is necessary for metallic potassium to use a temperature of not less than 64° C. which is the melting point thereof, it is necessary for metallic sodium to use a temperature of not less than 98° C. which is the melting point thereof, or it is necessary for metallic lithium to use a temperature of not less than 186° C. which is the melting point thereof. However, in order to quickly facilitate the reaction, it is preferable to perform the heat treatment at a temperature of not less than 250° C.

It is a matter of course that the electric double layer capacitor and the method for producing the same according to the present invention are not limited to the embodiments described above, which may be embodied in other various forms without deviating from the gist or essential characteristics of the present invention.

What is claimed is:

1. An electric double layer capacitor comprising polarizable electrodes consisting essentially of a carbon material immersed in an organic electrolyte, wherein:

said carbon material comprises semi-graphitized microcrystalline carbon; and an electrostatic capacity is expressed by insertion of ions of a solute of said organic electrolyte into a space between microcrystalline carbon layers of said carbon material.

2. The electric double layer capacitor according to claim 1, wherein said carbon material is produced by performing a heat treatment at not less than a temperature at which alkali metal vapor is generated, together with at least one of an alkali metal and an alkali metal compound, and said carbon material includes said semi-graphitized microcrystalline carbon.

3. The electric double layer capacitor according to claim 1, wherein said solute of said organic electrolyte is tetrafluoroborate or hexafluorophosphate of quaternary ammonium.

4. The electric double layer capacitor according to claim 1, wherein said solute of said organic electrolyte is tetrafluoroborate or hexafluorophosphate of tetraethylammonium or tetrabutylammonium.

5. The electric double layer capacitor according to claim 1, wherein said solute of said organic electrolyte is tetrafluoroborate or hexafluorophosphate of triethylmethylammonium.

6. The electric double layer capacitor according to claim 1, wherein said solute of said organic electrolyte is tetrafluoroborate or hexafluorophosphate of quaternary phosphonium.

7. The electric double layer capacitor according to claim 1, wherein said solute of said organic electrolyte is tetrafluoroborate or hexafluorophosphate of tetraethylphosphonium.

8. The electric double layer capacitor according to claim 1, wherein said solute of said organic electrolyte is tetrafluoroborate or hexafluorophosphate of imidazolium derivative represented by the following general formula:

wherein $R_1$ and $R_2$ are alkyl groups each having 1 to 5 carbon atoms, and $R_1$ and $R_2$ may be either the same group of different groups.

9. The electric double layer capacitor according to claim 1, wherein said solute of said organic electrolyte is tetrafluoroborate or hexafluorophosphate of 1-ethyl-3-methylimidazolium.

10. The electric double layer capacitor according to claim 1, wherein a solvent of said organic electrolyte contains at least one selected from the group consisting of propylene carbonate, γ-butyrolactone, ethylene carbonate, and sulfolane.

11. The electric double layer capacitor according to claim 1, wherein a solvent of said organic electrolyte is a mixture comprising:

a primary solvent containing at least one selected from the group consisting of propylene carbonate, γ-butyrolactone, ethylene carbonate, and sulfolane; and a secondary solvent containing at least one selected from the group consisting of dimethyl carbonate, ethyl methyl carbonate, and diethyl carbonate.

12. An electric double layer capacitor comprising polarizable electrodes consisting essentially of a carbon material immersed in an organic electrolyte, wherein:

said carbon material comprises a semi-graphitized microcrystalline carbon, said carbon material being produced by performing a heat treatment together with at least one of an alkali metal and an alkali metal compound, said heat treatment being conducted at a temperature which is not less than a temperature at which a vapor of said alkali metal is generated; and an electrostatic capacity is expressed by insertion of an ion of a solute of said organic electrolyte into a space between microcrystalline carbon layers of said carbon material.

\* \* \* \* \*